(12) United States Patent
Nicoll et al.

(10) Patent No.: US 6,484,936 B1
(45) Date of Patent: Nov. 26, 2002

(54) TERMINAL

(75) Inventors: Kenneth A. Nicoll, Dundee (GB); Wolf-Dieter Rossmann, Angus (GB); Grant C. Paton, Dundee (GB); Liem H. Leong, Dundee (GB); Michael R. McNamara, Edinburgh (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/433,138

(22) Filed: Nov. 3, 1999

(30) Foreign Application Priority Data

Nov. 11, 1998 (GB) .............................................. 9824697

(51) Int. Cl.[7] .............................................. G06F 17/60
(52) U.S. Cl. ............................. 235/379; 235/380; 902/3
(58) Field of Search .................................. 235/379, 380, 235/435; 902/3; 705/64, 72, 75, 5, 16, 18, 30

(56) References Cited

U.S. PATENT DOCUMENTS

| 5,127,043 A | | 6/1992 | Hunt et al. | |
| 6,119,096 A | * | 9/2000 | Mann et al. | .................... 705/5 |
| 6,263,319 B1 | * | 7/2001 | Leatherman | ................. 705/30 |

FOREIGN PATENT DOCUMENTS

| EP | 0086064 | 8/1983 |
| GB | 2139389 | 11/1984 |
| GB | 2314436 | 12/1997 |

* cited by examiner

*Primary Examiner*—Karl D. Frech
(74) *Attorney, Agent, or Firm*—Francis L. Conte

(57) ABSTRACT

A self-service terminal (10) includes a non-contact interface (18, 20) for enabling a user to interact with the terminal without requiring physical contact with the terminal, a biometric sensor (14) for establishing the identity of the user by sensing a physical trait or characteristic of the user, and a processor (30) for controlling the terminal. The interface (18, 20) may utilize speech recognition and generation.

19 Claims, 2 Drawing Sheets

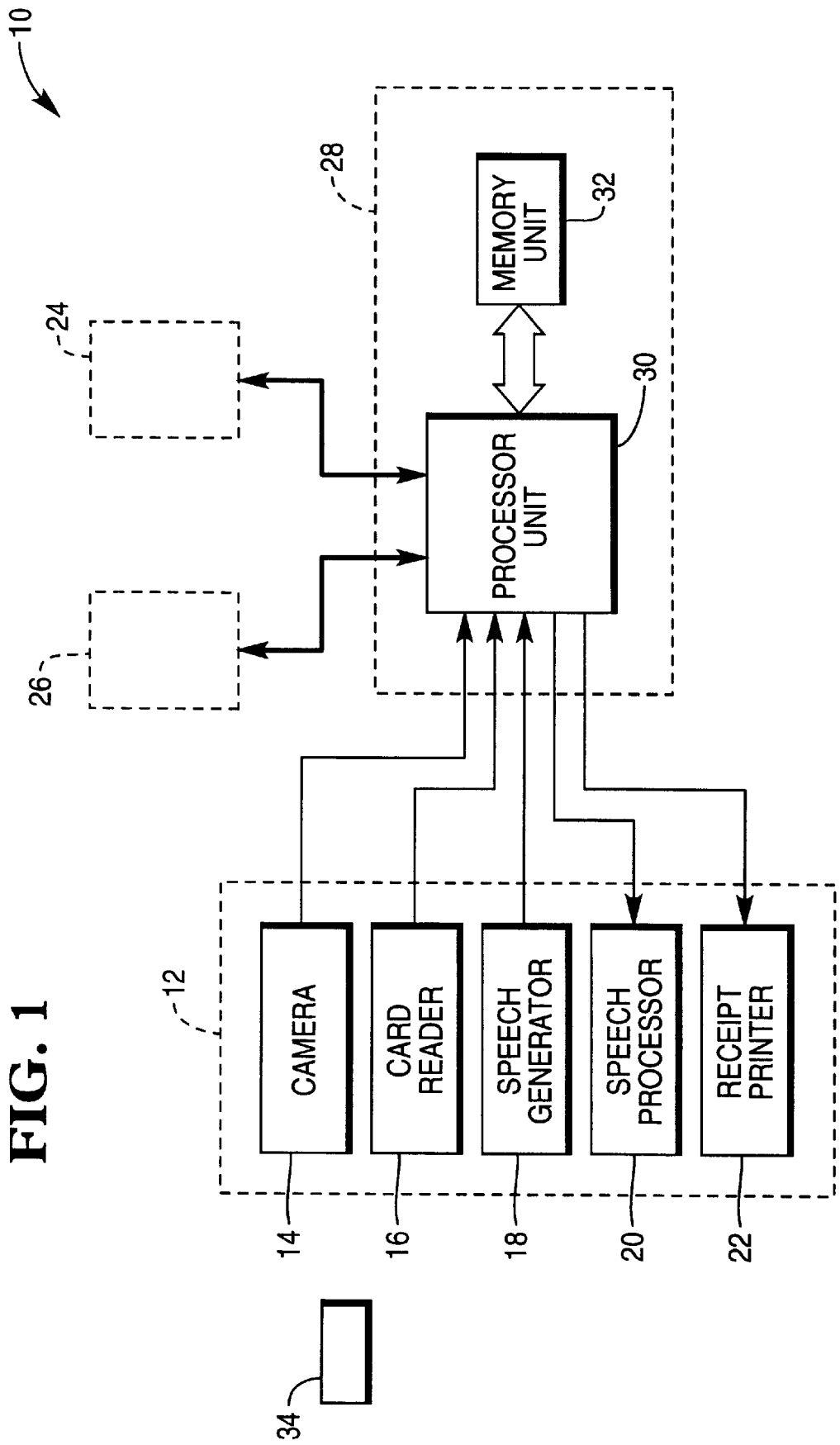

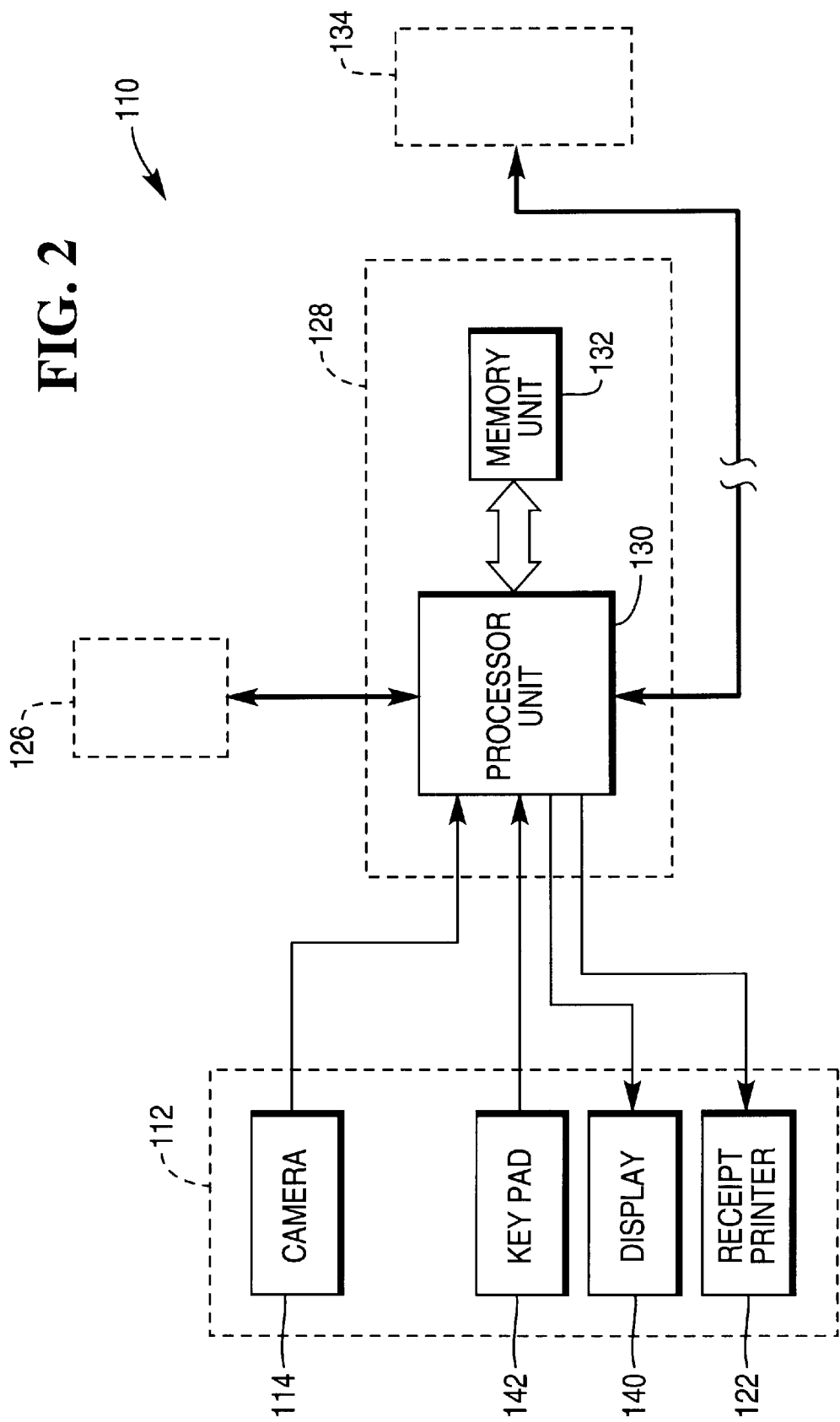

TERMINAL

BACKGROUND OF THE INVENTION

This invention relates to a terminal, such as a self-service terminal (SST), and typically an automated teller machine (ATM). Aspects of the invention also relate to a terminal for carrying out non-cash transactions, such as in outlets where customers purchase goods or services using credit or debit cards.

A conventional self-service terminal (SST), such as an automated teller machine (ATM), includes a card reader device to initiate a transaction, a keypad to input information and instructions to the terminal and a display to output instructions and information to the user. These devices are expensive and require a level of assumed knowledge and effort from the user.

In addition, these devices must be located conveniently for users of the terminal. In practice, a terminal will typically be set out in a compromise configuration; of course such a configuration may involve some difficulty for users who are shorter or taller than average, and will likely prove difficult if not impossible to access by wheelchair users. A somewhat similar difficulty arises in "drive-up" applications, where it is intended that the user may complete a transaction or operation using the terminal without leaving their vehicle. In this application, the terminal must attempt to accommodate variations in vehicle configuration as well as physical differences in users.

SUMMARY OF THE INVENTION

It is among the objectives of aspects of the present invention to provide a self-service terminal which obviates or mitigates these difficulties.

According to a first aspect of the present invention there is provided a self-service terminal comprising:

non-contact interface means for enabling a user to interact with the terminal without requiring physical contact with the terminal, biometric sensing means for establishing the identity of the user by sensing a physical trait or characteristic of the user; and processor means for controlling the terminal.

According to a second aspect of the present invention there is provided a method of operating a self-service terminal, the method comprising:

enabling a user to interact with the terminal without requiring physical contact with the terminal; and establishing the identity of the user by sensing a physical trait or characteristic of the user.

The provision of non-contact interface means in combination with biometric sensing means allows a user to interact with a terminal while requiring little or no physical contact or interaction with the terminal. This offers a number of significant advantages over existing terminals. For example, where the terminal is an ATM, it may be possible to dispense with a number of features found in conventional ATMs, such as the card reader device and input slot, the keypad to input information and the display. Accordingly, it may be possible to provide an ATM in accordance with the invention at significantly lower cost. Further, as there may be little or no need to interact with the terminal physically, a terminal may be made more easily accessible to users of a wide variety of statures and wheelchair users. Similarly, in "drive-through" applications, a terminal may be more easily accessed by users in a variety of vehicles. In preferred embodiments of the present invention in the form of ATMs, the only physical contact the user has with the terminal may be to withdraw banknotes from an appropriate cash dispenser slot.

The non-contact interface means may include one or both of means for outputting terminal instructions for the user in natural speech and means for inputting spoken user instructions for the terminal. Thus, the terminal and user may "converse".

The biometric sensing means may take any suitable form, preferably utilizing a non-contact technique such as iris pattern recognition, but said means may use other biometric patterns including facial geometry, fingerprints, palmprints, voice patterns, finger geometry or other physical traits or characteristics, or a combination of one or more of these.

Preferably, the biometric sensing means identifies the user, such that an operator may utilize the terminal without having to present a identification card or the like. Alternatively, said means may be used to verify the identity of a user, where the user has "claimed" an identity by presenting a means for identifying themself, such as an identification card or the like, to the terminal. In such an embodiment it is preferred that the identifying means does not require physical contact with the terminal, such as an identification card that may be read by the terminal using a camera of the like, or is capable of remote interrogation or communication with the terminal.

In order to establish the identity of a user by one or more biometric identifiers, it is of course first necessary to create a record of the user's biometric identifiers, which allows comparison between a biometric identifier sensed by the terminal and the stored information. When a best match is made, the user is offered the services available from the terminal. The information may be stored on a "smart" card carried by the user, or may be stored in a central database.

According to another aspect of the present invention there is provided a non-cash transaction terminal comprising:

interface means for enabling entry of transaction details;

biometric sensing means for identifying a user by sensing a physical trait or characteristic of the user; and processor means for controlling the terminal.

According to a further aspect of the present invention there is provided a method of carrying out a non-cash transaction, the method comprising:

providing a terminal;

entering transaction details in the terminal; and identifying a user by sensing a physical trait or characteristic of the user; and processing the transaction.

These aspects of the invention have application in retail stores and the like where users or customers wish to purchase goods or services. As the customer is identified by the terminal, there is no requirement for the customer to present a credit or debit card. Clearly this is more convenient for the customer and minimizes the possibility of fraud; a thief cannot obtain or "steal" an individual's biometric identifiers, whether this is an iris pattern or other identifier.

BRIEF DESCRIPTION OF THE DRAWINGS

These and other aspects of the present invention will now be described, by way of example, with reference to the accompanying drawings, in which:

FIG. 1 is a block diagram of a self-service terminal (SST), in the from of an automated teller machine (ATM), in accordance with an embodiment of one aspect of the present invention; and FIG. 2 is a block diagram of a non-cash transaction terminal in accordance with an embodiment of another aspect of the present invention.

DETAILED DESCRIPTION

Reference is first made to FIG. 1 of the drawings which is a block diagram representation of a self-service terminal, in the form of an ATM 10, in accordance with an embodiment of a first aspect of the present invention.

The ATM 10 has a user interface 12, incorporating a number of features and facilities, illustrated as individual modules. In the illustrated embodiment, these features include a camera 14, a non-contact card reader 16, a loudspeaker and speech generator 18, a microphone and speech processor 20 and a receipt printer 22, which is associated with a receipt printer slot (not shown) provided in the face of the machine.

FIG. 1 also shows a cash dispenser module 24 which is associated with a cash dispenser slot in the face of the machine, and a biometrics sensing processor unit 26 which operates in association with the camera 14, as will be described.

The ATM 10 further comprises processor means in the form of a controller unit 28 which communicates with components of the interface module block 12, with the cash dispenser module 24, and with the biometrics sensing processor unit 26. In a typical ATM, the controlling unit 28 will also communicate with an operator panel (not shown).

The controller unit 28 includes a processor unit 30 and a non-volatile memory 32 implemented by a micro-computer having non-volatile RAM.

The ATM 10 is used in conjunction with smart cards 34 which contain details of the user's selected biometric identifier.

In use, the user approaches the terminal 10 and places or holds the card 34 adjacent the terminal 10 such that the card reader 16 may read the customer details from the card 34 and initiate a transaction. Once the user has been identified, the camera 14 records an image of the iris pattern of the user and the image is conveyed, via the processor unit 30, to the biometrics sensing unit 26 where the iris pattern data read from the card 34, in the form of an enrolment template, is compared with the data received from the camera 14. Typically, the information stored on the card 34 will be in the form of an iris code, representing a processed image of the user's iris. The biometric sensing unit 26 processes the image received from the camera 14 to create a current iris code, or current template which is compared with the enrolment template stored on the card 34, to verify the identity of the user.

Typically, the enrolment template, in the form of a sequence of binary digits, is compared with the current template, also a sequence of binary digits, on a bit-by-bit basis using an exclusive OR function. To improve the speed of the comparison, all of the bit comparisons are performed simultaneously. The two templates match if they differ by less than a predetermined number of bits.

If the identity of the user is verified by the biometrics sensing unit 26, then the user is allowed to access the facilities provided by the ATM 10 and a menu of the various transactions available to the user may be relayed to the user, in natural speech, via the speech generator and loudspeaker 18. User responses are made via the microphone and speech processor 20.

It will be apparent to those of skill in the art that the ATM 10 allows users to interact with the ATM 10 with little or no physical contact with the ATM 10, a user only having to make their smart card 34 visible to the card reader 16, converse with the terminal 10 via the speech generator and loudspeaker 18 and the microphone and speech processor 20, and then retrieve any banknotes or receipts issued by the cash dispenser module 24 or receipt printer 22. Accordingly, the ATM 10 is easily accessible to a wide range of users. Further, the absence of a requirement to provide, for example, a display and keypad, allow greater flexibility in the configuration of user interfaces, and also minimizes the expense associated with the provision of such interfaces.

In other embodiments of this aspect of the present invention a self-service terminal may include a display or other features of a conventional ATM user interface panel.

In still further embodiments of this aspect of the present invention, the card reader 16 may be omitted, user identification being achieved solely by iris pattern recognition, or some other biometric sensing technique. For added security, and to accommodate imperfect biometric sensing, a plurality of biometric identifiers may be employed.

Reference is now made to FIG. 2 of the drawings, which is a block diagram of a noncash transaction terminal 110 in accordance with an embodiment of another aspect of the present invention. The terminal 110 is of the type commonly found in retail outlets, to allow a customer to purchase goods or services using a credit card or debit card.

The terminal 110 shares a number of functional features with the ATM 10 described above, and common functional elements are designated in FIG. 2 with the same numerals as the ATM illustrated in FIG. 1, prefixed by a "1".

In the illustrated embodiment, the terminal 110 is intended to operate without the use of a smart card, and utilizes a camera 114 which operates in conjunction with a biometric sensing processor unit 126 to identify the user. The terminal 110 is also provided with a keypad 142 to allow a sales assistant or the like to enter details of a transaction, for example the purchase price of an item. A display 140 is provided to allow verification of the information entered via the keypad 142, and may be used to display other messages and information as desired. To provide a hard copy record of a transaction, the terminal 110 also incorporates a receipt printer 122.

Whereas the iris code of the first embodiment described above was stored on a smart card 34, in this embodiment the iris code is stored in a remote database 134, the terminal processor unit 130 communicating with the database 134 as required.

In use, a user will register with a financial institution and an image of the iris pattern of one eye of the user is recorded and translated to the appropriate iris code and entered in the database 134.

If the user is a customer in a retail outlet and wishes to purchase some goods, a sales assistant directs the customer action to allow the biometrics examination to take place, for example by asking the customer to look towards the camera 114. If the customer has a number of accounts or payment options, the customer will also be asked to select the method of payment, which information may be entered via the keypad. The biometric sensing unit 126 then examines the iris pattern recorded by the camera 114, and then forwards the encoded biometrics details to the remote database 134 for identification. Once the customer has been identified the transaction is carried out in a secure manner.

It will be apparent to those of skill in the art that this embodiment offers the significant advantage that the customer need not carry or present a credit card or debit card, and thus the possibility of fraud is substantially reduced.

In other embodiments of this aspect of the present invention, a smart card, similar to the smart card 34 described above, could be utilized, rather than relying upon access to a remote database 134.

What is claimed is:

1. A self-service terminal comprising:

non-contact interface means for outputting terminal instructions to a user and enabling the user to interact with the terminal without requiring physical contact with the terminal for entering all input instructions thereto; and biometric sensing means for establishing the identity of the user by sensing a physical trait or characteristic of the user.

2. A terminal according to claim 1, wherein the biometric sensing means utilizes non-contact sensing.

3. A self-service terminal comprising:

non-contact interface means for enabling a user to interact with the terminal without requiring physical contact with the terminal for entering all input instructions thereto, and said interface means further includes a speech generator for outputting terminal instructions for the user in natural speech; and biometric sensing means for establishing the identity of the user by sensing a physical trait or characteristic of the user.

4. A self-service terminal comprising:

non-contact interface means for enabling a user to interact with the terminal without requiring physical contact with the terminal for entering all input instructions thereto, and said interface means further includes means for inputting spoken user instructions for the terminal; and biometric sensing means for establishing the identity of the user by sensing a physical trait or characteristic of the user.

5. An automated teller machine (ATM) comprising:

a cash dispenser for dispensing cash to an ATM customer, a non-contact customer interface for outputting terminal instructions to the ATM customer and enabling the ATM customer to interact with the ATM without requiring physical contact with the ATM for entering all input instructions thereto; and a biometric sensing unit for establishing the identity of the ATM customer by sensing a physical trait or characteristic of the ATM customer.

6. An ATM according to claim 5, wherein the biometric sensing unit utilizes non-contact sensing.

7. An automated teller machine ATM comprising:

a cash dispenser for dispensing cash to an ATM customer;

a non-contact customer interface for enabling the ATM customer to interact with the ATM without requiring physical contact with the ATM for entering all input instructions thereto, and said interface includes a speech generator for outputting terminal instructions for the ATM customer in natural speech; and a biometric sensing unit for establishing the identity of the ATM customer by sensing a physical trait or characteristic of the ATM customer includes a speech generator for outputting terminal instructions for the ATM customer in natural speech.

8. An automated teller machine ATM comprising:

a cash dispenser for dispensing cash to an ATM customer;

a non-contact customer interface for enabling the ATM customer to interact with the ATM without requiring physical contact with the ATM for entering all input instructions thereto, and said interface includes means for inputting spoken customer instructions for the ATM; and a biometric sensing unit for establishing the identity of the ATM customer by sensing a physical trait or characteristic of the ATM customer includes a speech generator for outputting terminal instructions for the ATM customer in natural speech.

9. A method of operating a self-service terminal, the method comprising the steps of:

outputting terminal instructions to a user;
 (a) enabling the user to interact with the terminal without requiring physical contact with the terminal for entering all input instructions thereto; and
 (b) establishing the identity of the user by sensing a physical trait or characteristic of the user.

10. A method according to claim 9, wherein the identity of the user is established by a non-contact technique.

11. A method according to claims 9, further comprising the steps of:

(c) creating a record of a user's biometric identifier; and
(d) comparing a biometric identifier sensed by the terminal with the record identifier.

12. A method of operating a self-service terminal, the method comprising the steps of:

(a) enabling a user to interact with the terminal without requiring physical contact with the terminal for entering all input instructions thereto;
(b) establishing the identity of the user by sensing a physical trait or characteristic of the user;
(c) outputting terminal instructions for the user in natural speech; and
(d) permitting inputting of spoken user instructions for the terminal.

13. A self-service transaction terminal comprising:

a digital computer for controlling operation of said terminal;

means for sensing a biometric identifier of a user of said terminal without physical contact with said user;

means for comparing said sensed identifier with a corresponding reference identifier to verify identify of said user;

means for outputting terminal instructions to said user; and means for entering all input instructions by said user to said terminal without physical contact therebetween to complete a transaction thereat.

14. A terminal according to claim 13 further comprising means for reading a user identification card without physical contact therewith to obtain said reference identifier stored therein.

15. A self-service transaction terminal comprising:

a digital computer for controlling operation of said terminal;

means for sensing a biometric identifier of a user of said terminal without physical contact with said user;

means for comparing said sensed identifier with a corresponding reference identifier to verify identify of said user;

means for reading a user identification card without physical contact therewith to obtain said reference identifier stored therein;

means for entering all input instructions by said user to said terminal without physical contact therebetween to complete a transaction thereat; and wherein said instruction entering means comprise a microphone for receiving spoken instructions from said user, and a speech processor therefor operatively joined to said computer.

16. A terminal according to claim 15 further comprising a speech generator and loudspeaker operatively joined to said computer for providing a spoken menu to said user.

17. A terminal according to claim 16 wherein said comparing means are configured to compare said sensed identifier and reference identifier in a simultaneous bit-by-bit comparison of corresponding binary digit sequences thereof.

18. A terminal according to claim 16 wherein said sensing means comprise a camera configured for recording an image of the iris pattern of said user as said biometric identifier.

19. A terminal according to claim 16 further comprising a cash dispenser module operatively joined to said computer, and having a cash dispenser slot for dispensing cash to said user.

* * * * *